United States Patent [19]

York et al.

[11] 4,185,542

[45] Jan. 29, 1980

[54] ACTUATOR WITH FRANGIBLE GLAND CONSTRUCTION

[75] Inventors: Ray A. York, Villa Park; William D. Simmons, Costa Mesa, both of Calif.

[73] Assignee: Bertea Corporation, Irvine, Calif.

[21] Appl. No.: 881,764

[22] Filed: Feb. 27, 1978

[51] Int. Cl.² .......................... F16J 15/16; F16J 11/02
[52] U.S. Cl. .......................................... 92/166; 92/171
[58] Field of Search ............... 137/797, 68 R; 92/166, 92/171

[56] References Cited

U.S. PATENT DOCUMENTS

| | | | |
|---|---|---|---|
| 2,613,683 | 10/1952 | Baird et al. | 137/68 R |
| 2,891,513 | 6/1959 | Fagge | 92/166 |
| 2,906,280 | 9/1959 | Mount | 137/68 R |
| 2,946,316 | 7/1960 | Bruehl | 92/166 |
| 3,719,194 | 3/1973 | Anderson et al. | 137/68 R |
| 3,884,127 | 5/1975 | Simmons | 92/151 |

*Primary Examiner*—Paul E. Maslousky
*Attorney, Agent, or Firm*—Gordon L. Peterson

[57] ABSTRACT

An actuator comprising a housing, a piston movable in the housing, a rod coupled to the piston and movable therewith, and a tubular member mounted in the housing and having a rod extending therethrough. A frangible section retains the tubular member against axial inward movement from a first position in the housing. When an axial inward force of at least a predetermined magnitude is applied to the tubular member, the frangible section ruptures to allow at least a portion of the tubular member to move axially inwardly. Armor is provided for protecting at least a portion of the housing.

12 Claims, 1 Drawing Figure

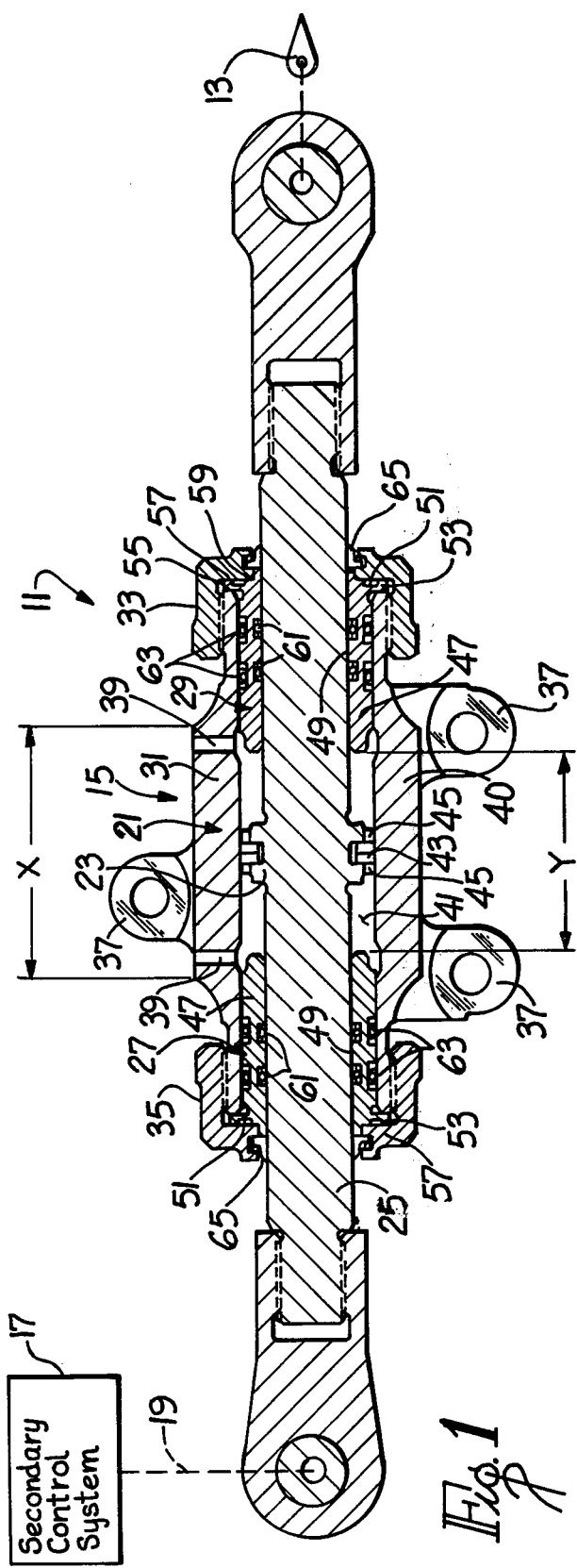
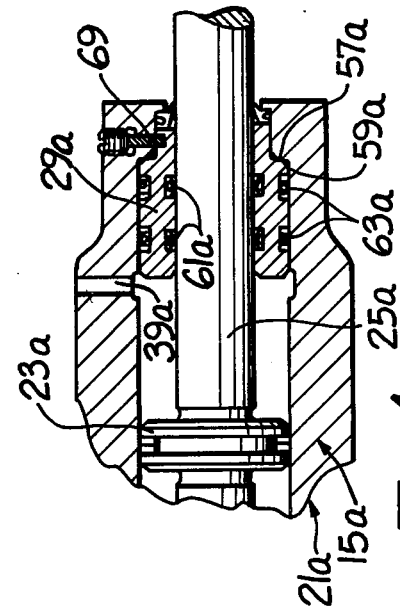
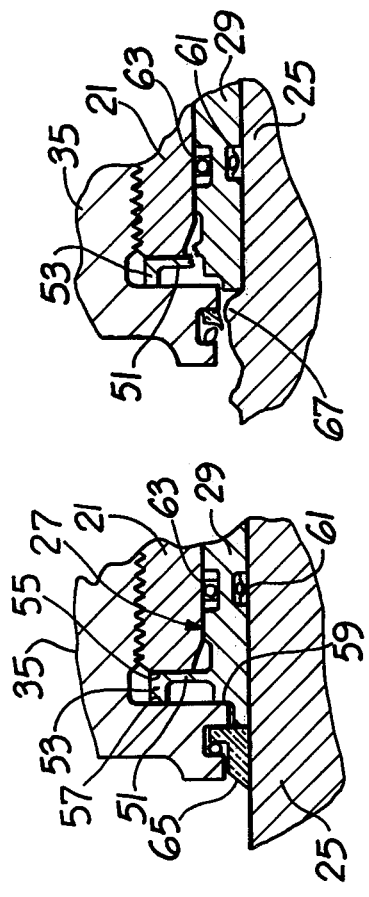

ACTUATOR WITH FRANGIBLE GLAND CONSTRUCTION

BACKGROUND OF THE INVENTION

Actuators of the type which include a piston movable in a housing are used to position or move various loads, such as the control surfaces of an aircraft. For reasons of safety, in aircraft applications dual actuators are employed to control the position of a control surface. If one actuator fails, the other actuator positions the control surface. However, because the pistons of the two actuators are movable together, if the movement of one piston is restricted or prevented, neither actuator can function properly.

In a typical actuator of this type, a connecting rod is joined to the piston and extends through an opening in a tubular member of gland. The motion of the piston is transmitted by way of the connecting rod to an output member which may be an aircraft control surface. One kind of damage which can lead to malfunctioning of both actuators is damage to the connecting rod of the type which forms an abutment or projection on the connecting rod. For example, in military aircraft, this may be caused by an enemy projectile passing through the connecting rod with consequent deformation of the rod to form the projection. In this event, movement of the piston will cause the projection on the rod to engage the tubular member. This engagement prevents further movement of the piston and rod in that direction and may cause jamming of the actuator. In either event, the advantages of redundant actuators are lost.

Simmons U.S. Pat. No. 3,884,127 solves this problem by providing a frangible inner periphery on the tubular member. With this construction, when the projection on the rod strikes the frangible inner periphery of the tubular member, the frangible inner periphery breaks to permit the rod with the projection thereon to pass through the opening in the tubular member. Consequently, even though the damaged actuator is no longer able to control the position of the control surface, it does not prevent the undamaged actuator from controlling the position of the control surface.

Although the patented construction is very satisfactory, the frangible inner periphery is not alone suitable to serve as a bearing for the rod. To incorporate bearing features, a three-piece gland which has three separate frangible sections has been used. When the projection is formed on the rod axially inwardly of the gland, then outward movement of the rod sequentially breaks two of the frangible sections to permit movement of one piece of the gland axially outwardly with the rod. Conversely, when the projection is formed on the rod axially outwardly of the gland, axial inward movement of the rod causes the fracture of two of the frangible sections and the inward movement of two of the pieces of the gland.

While this construction is desirable because it gives the gland the desired bearing capacity, it is relatively costly and complex. In addition, it increases the weight penalty on the aircraft. Finally, it has been found that certain projectiles which strike the housing of the actuator may have insufficient force to pass completely through the actuator. These projectiles may become lodged in both the actuator housing and the rod. Such projectiles have the tendency to "nail" the rod to the housing with the result that the frangible sections never have an opportunity to perform their function.

SUMMARY OF THE INVENTION

The present invention solves the problems noted above. For example, to prevent nailing of the rod to the housing, armor means is provided for protecting at least a portion of the housing. The armor is of such a nature as to be substantially impenetrable by at least some enemy-fired projectiles and fragments and so it may be assumed that the portion of the housing protected by the armor will not be damaged to the extent that it will totally lose its ability to operate. The armor may be integral with the housing or provided as a separate member. The armor may extend over whatever portion of the housing it is desired to protect. For example, the armor may cover only the region swept by the piston during operation of the actuator or it may protect the entire housing.

Although all or a portion of the housing is protected, the portion of the rod outside of the housing is relatively unprotected and subject to damage and consequent distortion. Although armor could be used to protect the entire actuator, this would greatly increase the weight penalty on the aircraft.

To reduce the cost, complexity and weight penalty on the aircraft, the present invention provides a tubular member which accommodates projections formed on the rod axially outwardly of the tubular member but does not accommodate projections formed on the rod axially inwardly of the tubular member. Thus, the tubular member has a unidirectional breakout in lieu of the bi-directional breakout of the prior art. Because armor is used, only a unidirectional breakout is needed. The unidirectional breakout is less complex, less expensive and weighs less than the tubular member with a bi-directional breakout. Of course, the tubular member with the unidirectional breakout can be used with or without armor protecting at least a portion of the housing. If armor is not used, it is assumed that any projectile striking the housing will pass through it.

The tubular member is retained in the housing, at least in part, by frangible means which are responsive to an axial inward force on the tubular member of at least a predetermined magnitude to break to allow the tubular member to move inwardly. This, in turn, allows the rod, and any projection that may have been formed thereon, to also move farther axially inwardly.

The frangible means can be provided in different ways. For example, the frangible means may include a frangible pin joining the tubular member to the housing. Alternatively, the frangible means may include a frangible section on the tubular member. In this latter case, the tubular member can advantageously include a main body having an opening extending therethrough and a frangible section at least partially circumscribing the main body.

The frangible means can be considered to be part of the tubular member mounting means as in the case of the frangible pin or it may be considered to be a part of the tubular member as when a frangible section is provided integrally with the tubular member. In either event, the frangible means retains a very substantial portion of the tubular member against axial inward movement in the housing so that when the frangible means is broken, the tubular member or a substantial portion thereof can move inwardly in the housing.

The frangible means can be formed in different ways, such as by utilizing a section of metal of reduced thickness, scoring, etc. The frangible means should be weak enough so that it will break when struck by the projection on the rod when the rod is being driven by the control system. For example, if an actuator system including dual actuators is employed, then the force from the undamaged actuator driving the rod should be sufficient to rupture the frangible means. Similarly, if the actuator system includes one actuator and a provision for manual control when the actuator is damaged, then the frangible means should be weak enough to be ruptured by the force provided by manual operation. Thus, the frangible means is intentionally weak and is designed to rupture.

To assure that the tubular member has only a unidirectional breakout, it is necessary to support the tubular member in the housing so that the frangible means will not break when axial outward forces are applied to it. This can be accomplished, for example, by providing a structural segment on the housing cooperable with a structural segment of the tubular member to prevent movement of the tubular member outwardly from a first position, even in the presence of substantial forces urging the tubular member axially outwardly relative to the housing. The structural segments should be capable of withstanding a much greater force than the axial inward force which ruptures the frangible means. The structural segments may be in engagement or may have one or more members interposed therebetween so long as the axial outward force applied to the tubular member is ultimately reacted through both of the structural segments to the housing.

With this invention, the tubular member can advantageously be of one-piece unitary construction. The tubular member preferably carries seals on its inner and outer peripheries to substantially prevent fluid leakage from the housing.

The invention, together with further features and advantages thereof, may best be understood by reference to the following description taken in connection with the illustrative drawings.

BRIEF DESCRIPTION OF THE DRAWINGS

FIG. 1 illustrates one form of actuator system constructed in accordance with the teachings of this invention with the actuator being shown in longitudinal section.

FIG. 2 is an enlarged fragmentary sectional view showing the region of the actuator adjacent the frangible section.

FIG. 3 is an enlarged fragmentary sectional view illustrating the rupturing of the frangible section.

FIG. 4 is a somewhat schematic fragmentary sectional view showing another form of actuator constructed in accordance with the teachings of this invention.

DESCRIPTION OF THE PREFERRED EMBODIMENTS

FIG. 1 shows an actuator system 11 for controlling the position of a control surface 13 of an aircraft. Generally, the actuator system 11 includes an actuator 15 and a secondary control system 17. The secondary control system 17 may be any device capable of suitably positioning the control surface 13. For example, the secondary control system 17 may be an actuator identical to the actuator 15 or it may include the necessary linkage and cables to permit manual control of the control surface 13 by the pilot of the aircraft. In the embodiment illustrated, the actuator 15 and the secondary control system 17 are mechanically coupled via a link or linkage 19 so that their outputs move together to control the position of the control surface.

The actuator 15 includes a housing 21, a piston 23 slidable within the housing, a connecting rod 25 and tubular members in the form of glands 27 and 29 at opposite ends of the housing. The housing 21 includes a peripheral wall 31 and identical apertured end caps 33 and 35 suitably attached to the opposite ends of the peripheral wall as by screw threads and/or welds. Mounting flanges 37 are provided on the housing 21 for attaching the housing to external structure. The housing has ports 39 to permit fluid to be supplied to the housing and expelled from the housing.

A portion of the housing 21 is constructed of armor to protect such portion of the housing and the contents of the housing. In the embodiment illustrated, the peripheral wall 31 is constructed of armor, such as a suitable heat-treated stell to make it substantially impenetrable by many known projectiles. Although various regions of the housing 21 can be armor protected, in the embodiment illustrated, the armor is considered sufficiently thick so as to be substantially impenetrable in an armored region 40 which extends throughout the line or dimension X and for 360 degrees around the peripheral wall 31.

The housing 21 has a chamber or cylider 41 therein in which the piston 23 moves. Although the pistion 23 may be of various different constructions, in the embodiment illustrated, it carries a seal 43 between axially spaced annular frangible regions 45. Thus, the piston 23 may be constructed in accordance with Simmons U.S. Pat. No. 3,884,127.

In the embodiment illustrated, the piston moves through a stroke as shown by the line Y in FIG. 1. Theline X representing the length of the armored portion of the peripheral wall 31 extends for the full length of the line Y and beyond the end of the line Y so that the housing 21 is protected for the full length of the stroke of the piston 23.

The glands 27 and 29 are identical mirror images of each other, and accordingly, only the gland 27 is described in detail herein. Portions of the gland 29 corresponding to portions of the gland 27 are designated by corresponding reference numerals. The gland 27 includes a main body 47 having a cylindrical opening 49 extending axially therethrough, an annular frangible section 51 and an annular thickened clamping section 53. The gland 27, which may be constructed of a lightweight metal, such as aluminum, is preferably integrally constructed as a one-piece member. The frangible section 51 in the embodiment illustrated is in the form of a continuous annular web of substantially decreased thickness which surrounds a region of the main body 47 and integrally joins it to the clamping section 53. The strength of the frangible section is carefully determined in order that it will rupture at the desired loading. The frangible section 51 must be sufficiently stront to withstand frictional forces exerted on the gland 27 by movement of the rod 25. The clamping section 53 in the embodiment illustrated is in the form of a continuous annular bead integral with the outer radial edge of the frangible section 51.

The main body 47 is slidably received in one end of the passage through the peripheral wall of the housing 21. The gland 27 is held in place by clamping the clamping section 53 between an annular end face 55 of the peripheral wall 31 and an annular end wall 57 of the end cap 33. Accordingly, all that prevents the gland 27 from sliding axially inwardly in the housing 21 is the frangible section 51.

To prevent the gland 27 from moving axially outwardly, the end wall 57 extends radially inwardly sufficiently to engage a shoulder 59 on the main body 47. The end wall 57 and the shoulder 59 constitute strong structural segments of the end cap 33 and the gland 27, respectively. Any forces encountered during normal usage or operation of the actuator 15 would be insufficient to move the gland 27 axially outwardly. Accordingly, the frangible section 51 does not rupture in response to axial outward forces on the gland 27.

The rod 25 is slidably received in the openings 49 of the glands 27 and 29 and extends axially outwardly beyond the opposite ends of the housing 21. Internal seals 61 are carried by the glands 27 and 29 to seal the rod-gland interface. Similarly, external seals 63 are carried by the glands 27 and 29 to seal the gland-peripheral wall 31 interface. Annular wipers 65 of suitable soft material are carried by the end caps 33 and 35. The rod 25 is unprotected to the extent that it extends outside the armored region 40 of the housing 21. The rod 25 in the embodiment illustrated is constructed of a suitable metal, such as steel, and is subject to having a projection 67 (FIG. 3) formed thereon as a result of the rod being struck by a projectile or by being inadvertently struck, such as by a workmen's tool. One end of the rod 25 is suitably coupled to the control surface 13 so that the control surface can be positioned by movement of the rod in a conventional manner.

In normal operation of the actuator system 11, fluid is supplied to the ports 39 to move the piston 23 and the rod 25 in either direction to thereby position the control surface 13 in a well-known manner. If an enemy projectile should strike the unprotected portion of the rod outboard of the gland 27, the projection 67 is formed as shown in FIG. 3. Ultimately, it will become necessary to position the control surface 13 in such a manner that the position 23 and the rod 25 move to the right to move the projection 67 axially inwardly toward the gland 27. When this occurs, the projection easily cuts through the soft material of the wiper 65 and contacts the left end face of the gland 27. When the projection 67 strikes the left end face of the gland 27, fluid pressure on the left-hand face of the piston 23 and/or force from the secondary control system 17 increase until a sufficient force is supplied to the gland 27 to rupture the frangible section 51. Thereafter, the main body 47 of the gland 27 and the rod 25 moves to the right as a unit. Of course, the gland 29 operates in the same manner.

The housing 21 can be penetrated by a projectile in the regions where the glands 27 and 29 are located. However, this will not result in a projection which impedes the travel of the piston 23. Moreover, if the rod 25 jams to the gland 27 as a result of such penetration, the frangible section 51 can be broken as described above to free the rod 25 for movement.

If a projectile should strike the armored region 40 of the housing 21, it will not be able to penetrate the armored region so as to cause a projection in the rod 25. Consequently, it is not contemplated that it will be necessary for the gland 27 to have a capability of breakout in response to axial outward forces. However, should a projectile provide a projection or abutment on the interior surface of the armored region 40, the frangible regions 45 function as described in Simmons U.S. Pat. No. 3,884,127 to prevent the actuator 15 from jamming or otherwise preventing the secondary control system 17 from controlling the position of the control surface 13.

FIG. 4 shows an actuator 15a which is identical to the actuator 15 in all respects not shown or described herein. Portions of the actuator 15a corresponding to portions of the actuator 15 are designated by corresponding reference numerals followed by the letter "a."

One difference between the actuator 15 and the actuator 15a is that the housing 21a of the latter is constructed entirely of armor so that it can be assumed that the entire housing is not penetrable. Secondly, the gland 29a, is retained against axial inward movement in the housing 21a by a one-piece radially extending frangible pin 69. The frangible pin 69 may break in response to the same axial inward force that would break the frangible section 51 (FIG. 1). Axial outward movement of the gland 29a from the position shown in FIG. 4 is prevented by engagement of an end wall 57a of the housing and a shoulder 59a of the gland 29a. Otherwise, except for some change in configuration of the housing 21a and the gland 29a, the embodiment of FIG. 4 is basically the same as the embodiment of FIG. 1-3.

Although exemplary embodiments of the invention have been shown and described, many changes, modifications and substitutions may be made by one having ordinary skill in the art without necessarily departing from the spirit and scope of this invention.

We claim:
1. An actuator comprising:
   a housing;
   a piston movable in said housing;
   a rod coupled to said piston and movable therewith, said rod extending through at least one end of said housing;
   a tubular member having an opening extending through the tubular member;
   means for mounting the tubular member in the housing with the rod extending through the opening in the tubular member;
   at least the portion of the rod axially outwardly of the tubular member being deformable in response to a blow to provide a projection on the rod outwardly of the tubular member whereby movement of the piston and the rod in a direction to move the projection inwardly causes the projection to strike the tubular member and apply a generally axially inward force to the tubular member;
   at least one of said mounting means and said tubular member including frangible means responsive to the projection applying an axial inward force to the tubular member of at least a predetermined magnitude to break and allow the piston, the rod and the projection to move further in said direction and to allow at least a portion of the tubular member to move in said direction;
   said mounting means and said tubular member being substantially nonfrangible in response to a force applied to the tubular member in an axially outward direction; and
   armor means for protecting at least a portion of said housing.
2. An actuator as defined in claim 1 wherein said frangible means is interposed between the housing and said portion of the tubular member whereby the frangi- ble, means joins at least said portion of said tubular member to said housing.

3. An actuator as defined in claim 1 wherein said piston can be moved longitudinally through a region of said housing and said armor means protects at least said region of said housing.

4. An actuator comprising:
a housing;
a piston movable in said housing;
a rod coupled to said piston and movable therewith, said rod extending through at least one end of said housing;
a tubular member including a main body having an opening extending therethrough and a frangible section at least partially circumscribing the main body;
means for attaching the frangible section to the housing with the tubular member being at a first position in said housing and with the rod extending through the opening in the tubular member;
at least the portion of the rod axially outwardly of the tubular member being deformable in response to a blow to provide a projection of the rod outwardly of the tubular member whereby movement of the piston and the rod in a direction to move the projection inwardly causes the projection to strike the tubular member and apply a generally axially inwardly directed force to the tubular member;
said frangible section being of reduced strength and responsive to the projection applying axial inward force to the tubular member of at least a predetermined magnitude to break to allow the main body, the rod and the projection to move inwardly; and
a structural segment on said housing, said structural segment being cooperable with said main body to substantially prevent movement of the tubular member outwardly from said first position even in the presence of substantial forces urging the tubular member outwardly relative to the housing.

5. An actuator as defined in claim 4 wherein said frangible section is a thin annular section which surrounds the main body, said tubular member has a thickened section coupled to said frangible section and said attaching means includes means for clamping said thickened section to said housing.

6. An actuator as defined in claim 4 wherein said structural segment engages said main body to substantially prevent movement of the tubular member outwardly from the first position.

7. An actuator as defined in claim 4 wherein said tubular member is a one-piece member of integral construction.

8. An actuator as defined in claim 4 including armor means for protecting at least a portion of said housing.

9. An actuator system for moving a control surface of an aircraft, said actuator system comprising:
an actuator;
said actuator including a housing, a piston movable in said housing, a rod coupled to said piston and movable therewith, said rod extending through at least one end of said housing and said housing being adapted to receive fluid under pressure to move said piston in said housing;
means for drivingly interrelating said rod and the control surface so that movement of the piston can cause movement of the control surface;
second means drivingly interrelated to said actuator for causing said control surface to move whereby either said actuator or said second means can move the control surface;
said actuator including a tubular member having an opening extending through the tubular member and means for mounting the tubular member in the housing with the rod extending through the opening in the tubular member;
at least the portion of the rod axially outwardly of the tubular member being deformable in response to a blow to provide a projection on the rod outwardly of the tubular member whereby movement of the piston and the rod in a direction to move the projection inwardly causes the projection to strike the tubular member and apply a generally axially inward force to the tubular member;
at least one of said mounting means and said tubular member including frangible means responsive to the projection applying an axial inward force to the tubular member of at least a predetermined magnitude to break and allow the piston, the rod and the projection to move further in said direction and to allow at least a portion of the tubular member to move in said direction;
said mounting means and said tubular member being substantially nonfrangible in response to a force applied to the tubular member in an axially outward direction; and
armor means for protecting at least a portion of said housing.

10. An actuator comprising
a housing;
a piston movable in said housing;
a rod coupled to said piston and movable therewith, said rod extending through at least one end of said housing;
a one-piece gland having an opening extending therethrough;
frangible means for attaching the one-piece gland to the housing with the gland being at a first position in said housing and with the rod extending through the opening in the gland;
seal means carried by the gland for providing a first seal between the gland and the housing and a second seal between the glad and the rod;
at least the portion of the rod axially outwardly of the gland being deformable in response to a blow to provide a projection on the rod outwardly of the gland whereby movement of the piston and the rod in a direction to move the projection inwardly causes the projection to strike the gland and apply a generally axially inwardly directed force to the gland;
said frangible means being of reduced strength and responsive to the projection applying axial inward force to the gland of at least a predetermined magnitude to break to allow the gland, the rod and the projection to move inwardly; and
a structural segment on said housing, said structural segment being cooperable with said gland to substantially prevent movement of the gland outwardly from said first position even in the presence of substantial forces urging the gland outwardly relative to the housing.

11. An actuator comprising:
a housing;
a piston movable in said housing;

a rod coupled to said piston and movable therewith, said rod extending through at least one end of said housing;

a tubular member having an opening extending through the tubular member;

means for mounting the tubular member in the housing with the rod extending through the opening in the tubular member;

at least the portion of the rod axially outwardly of the tubular member being deformable in response to a blow to provide a projection on the rod outwardly of the tubular member whereby movement of the piston and the rod in a direction to move the projection inwardly causes the projection to strike the tubular member and apply a generally axially inward force to the tubular member;

at least one of said mounting means and said tubular member including frangible means responsive to the projection applying an axial inward force to the tubular member of at least a predetermined magnitude to break and allow the piston, the rod and the projection to move further in said direction;

said mounting means and said tubular member being substantially nonfrangible in response to a force applied to the tubular member in an axially outward direction;

armor means for protecting at least a portion of said housing; and said frangible means retaining said tubular member in a first position in the housing against movement inwardly from said first position, said mounting means and said tubular member including cooperating structural segments for substantially preventing significant movement of the tubular member axially outwardly from said first position relative to said housing.

12. An actuator comprising:

a housing;

a piston movable in said housing;

a rod coupled to said piston and movable therewith, said rod extending through at least one end of said housing;

a tubular member having an opening extending through the tubular member;

means for mounting the tubular member in the housing with the rod extending through the opening in the tubular member;

at least the portion of the rod axially outwardly of the tubular member being deformable in response to a blow to provide a projection on the rod outwardly of the tubular member whereby movement of the piston and the rod in a direction to move the projection inwardly causes the projection to strike the tubular member and apply a generally axially inward force to the tubular member;

at least one of said mounting means and said tubular member including frangible means responsive to the projection applying an axial inward force to the tubular member of at least a predetermined magnitude to break and allow the piston, the rod and the projection to move further in said direction;

said mounting means and said tubular member being substantially nonfrangible in response to a force applied to the tubular member in an axially outward direction;

armor means for protecting at least a portion of said housing; and said frangible means including a frangible section on the tubular member, said mounting means and said tubular member including cooperating structural segments for substantially preventing significant movement of the tubular member axially outwardly relative to the housing whereby the structural segments prevent the frangible section from rupturing in response to forces tending to move the tubular member axially outwardly relative to the housing.

* * * * *